US008050899B2

(12) United States Patent
Giguere et al.

(10) Patent No.: US 8,050,899 B2
(45) Date of Patent: Nov. 1, 2011

(54) METHOD FOR WIND TURBINE PLACEMENT IN A WIND POWER PLANT

(75) Inventors: Philippe Giguere, Simpsonville, SC (US); Venkatarao Ryali, Karnataka (IN); Manish Gupta, Karnataka (IN); Karsten Hilt, Salzbergen Niedersachsen (DE); Srinivasa Reddy Gujju, Karnataka (IN)

(73) Assignee: General Electric Company, Schenectady, NY (US)

( * ) Notice: Subject to any disclaimer, the term of this patent is extended or adjusted under 35 U.S.C. 154(b) by 606 days.

(21) Appl. No.: 12/130,509

(22) Filed: May 30, 2008

(65) Prior Publication Data
US 2009/0295165 A1    Dec. 3, 2009

(51) Int. Cl.
*G06G 7/54*   (2006.01)
*F02C 3/14*   (2006.01)
*G05D 3/12*   (2006.01)

(52) U.S. Cl. ............ 703/6; 60/39.34; 700/286; 700/287

(58) Field of Classification Search .............. 703/6, 10, 703/18; 700/286, 287, 290; 60/39.34
See application file for complete search history.

(56) References Cited

U.S. PATENT DOCUMENTS

| 4,155,252 | A | 5/1979 | Morrill |
| 5,646,343 | A | 7/1997 | Pritchard |
| 6,763,291 | B1 | 7/2004 | Houpt et al. |
| 7,285,926 | B2 | 10/2007 | McGarry et al. |
| 2003/0149584 | A1 | 8/2003 | Wobben |
| 2009/0046289 | A1* | 2/2009 | Caldwell et al. ............ 356/341 |
| 2009/0099702 | A1* | 4/2009 | Vyas et al. .................. 700/287 |

OTHER PUBLICATIONS

G. Mosetti, C. Poloni and B. Diviacco, "Optimization of wind turbine positioning in large windfarms by means of a genetic algorithm," Journal of Wind Engineering and Industrial Aerodynamics, vol. 51, Issue 1, Jan. 1994, pp. 105-116.
S.A. Grady, M.Y. Hussaini and M.M. Abdullah, "Placement of wind turbines using genetic algorithms," Renewable Energy, vol. 30, Issue 2, Feb. 2005, pp. 259-270.
J.C. Mora, J.M.C. Baron, J.M.R. Santos, M.B. Payan, "An evolutive algorithm for wind farm optimal design," Neurocomputing, vol. 70, Oct. 2007, pp. 2651-2658.
H.S. Huang, "Distributed Genetic Algorithm for Optimization of Wind Farm Annual Profits" IEEE International Conference on Intelligent Systems Applications to Power Systems, Nov. 2007.
Ozturk, U.A., and Norman B.A., "Heuristic Methods for Wind Energy Conversion System Positioning," electric Power System Research 70.3 (2004): pp. 179-185, 2004.
C.N. Elkinton, J.F. Manwell and J.G. McGowan, "Offshore Wind Farm Layout Optimization (OWFLO) Project: An Introduction" (http://www.ceere.org/rerl/publications/published/2005/COW05_OWFLO.pdf), pp. 1-11, Dec. 2005.

* cited by examiner

Primary Examiner — Paul Rodriguez
Assistant Examiner — Andre Pierre Louis
(74) Attorney, Agent, or Firm — McNees Wallace & Nurick LLC (57) ABSTRACT

A method for determining wind turbine location within a wind power plant based on at least one design criteria. A wind turbine layout including at least one wind turbine location is prepared and site conditions at each wind turbine location are determined. One or more plant design metrics are evaluated in response to the site conditions. The plant design metrics are analyzed in response to the site conditions. The method further includes applying constraints to the wind turbine layout and comparing the plant design metrics to the design criteria and constraints. Thereafter, the wind turbine locations are selectively adjusted within the layout in response to the comparing step until a stop criteria is reached.

20 Claims, 10 Drawing Sheets

METHOD FOR WIND TURBINE PLACEMENT IN A WIND POWER PLANT

FIELD OF THE INVENTION

The present invention is directed generally to wind turbines, and more particularly to a method for increasing energy capture in a wind power plant. In particular, the present invention includes a method for determining desirable locations for wind turbines within a wind power plant site to achieve wind power plant design and operational goals.

BACKGROUND OF THE INVENTION

Recently, wind turbines have received increased attention as environmentally safe and relatively inexpensive alternative energy sources. With this growing interest, considerable efforts have been made to develop wind turbines and wind turbine plants that are reliable and efficient.

Generally, a wind turbine includes a rotor having multiple blades. The rotor is mounted to a housing or nacelle, which is positioned on top of a truss or tubular tower. Utility scale wind turbines (i.e., wind turbines designed to provide electrical power to a utility grid) can have large rotors (e.g., 30 or more meters in length). In addition, the wind turbines are typically mounted on towers that are at least 60 meters in height. Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid. In other wind turbine configurations, the gearbox may be omitted and the generator may be directly driven or driven through some other type of coupling.

Wind turbine placement optimization within a wind power plant has traditionally been performed with the single objective of maximizing energy production. For example, wind turbine can be placed at the locations within the wind plant having the highest winds based on a wind resource grid and then manually adjusting the turbine layout according to constraints such as exclusion zones and/or minimum spacing constraint. A wind resource grid can be generated using commercially available wind resource assessment or modeling software such as WindPro™ (available from EMD International A/S, Aalborg, Denmark), WindFarmer™ (available from Garrad Hassan, Bristol United Kingdom), or WindFarm™ (available form ReSoft Ltd., Banbury, United Kingdom). There are other design objectives of importance such as minimizing the cost of the wind plant, maximizing financial metrics, and minimizing noise. Typically, noise is a constraint whereas a certain noise level cannot be exceeded at one or more locations. To address cost, financial metrics, and noise constraints, commercial software such as WindPro™, WindFarmer™, or WindFarm™ offer analysis modules that can be used to manually adjust the turbine layout as desired. Therefore, the process of optimizing a turbine layout is iterative and manual. To reduce the manual or trial and error component of optimizing a turbine layout, commercially available wind resource assessment software have an optimization algorithm allowing for the automatic maximization of energy production for a fixed number of wind turbines and a particular wind turbine model/configuration. Noise constraints as well as areas for which wind turbines cannot be installed can be enforced. Additional analyses are needed before the turbine layout can be finalized. One of these additional analyses is the calculation of the mechanical loads on each wind turbine to ensure that they are within the design limits of the wind turbine model(s)/configuration(s) of interest. This task is almost exclusively performed by the wind turbine manufacturer because of their detailed design information and proprietary wind turbine modeling capabilities. Detailed knowledge of the design load margins (site specific loads-design loads) allows the minimization of these load margins, which in turn can yield additional energy capture. Currently, no known method available provides multi-disciplinary optimization capabilities for multiple criteria and constraints that directly include the assessment of mechanical loads.

Therefore, what is needed is a multi-disciplinary method for determining wind turbine placement within a wind power plant that efficiently provides the desired plant design and operational goals according to multiple criteria and constraints including mechanical loads analysis to obtain detailed design load margins.

SUMMARY OF THE INVENTION

One aspect of the invention includes a method for determining wind turbine location within a wind power plant. The method includes determining at least one design criteria. A wind turbine layout including at least one wind turbine location is prepared and site conditions at each wind turbine location are determined. One or more plant design metrics are evaluated in response to the site conditions. The plant design metrics are analyzed in response to the site conditions. The method further includes applying constraints to the wind turbine layout and comparing plant design metrics and constraints to design criteria. Thereafter, the wind turbine locations are selectively adjusted within the layout in response to the comparing step.

Another aspect of the disclosure includes a wind plant having a plurality of wind turbines disposed in locations corresponding to a calculated wind turbine layout. The calculated wind turbine layout is determined based on at least one design criteria and using a methodology by determining wind turbine locations within a wind power plant that best meet the wind plant design criteria. An initial wind turbine layout including at least one wind turbine location is prepared and site conditions at each wind turbine location are determined. One or more plant design metrics are evaluated in response to the site conditions. The plant design metrics are analyzed in response to the site. The method further includes applying constraints to the wind turbine layout and comparing plant design metrics and constraints to the design criteria. Thereafter, the wind turbine locations are selectively adjusted in response to the comparing step.

Still another aspect of the present disclosure includes a method for determining a wind turbine layout. The method includes determining at least one design criteria. A wind turbine layout including at least one wind turbine location is prepared and site conditions at each wind turbine location are determined. One more plant design metrics are evaluated in response to the site conditions. The plant design metrics are analyzed in response to site conditions. The method further includes applying constraints to the wind turbine layout and comparing plant design metrics and constraints to design criteria. Thereafter, the wind turbine locations are selectively adjusted within the layout in response to the comparing step. The method includes design criteria that are externally provided and selectively adjusting is continued until the layout meets the design criteria.

The method of the present disclosure includes the capability to calculating optimum or near optimum operation with a large number of turbines, a variable number of turbines, different models and configurations of turbines, complex site orography, topography, and surface roughness, domain knowledge to reduce the search area by, for example, excluding low wind speed zones, complex acoustic noise models, detailed cost models covering infrastructure and financial metrics.

Another advantage is that the method includes a computationally efficient, accurate and robust platform for wind turbine location optimization.

Another advantage is that the method includes multi-disciplines including, for example, (1) wind resource assessment and prediction of the energy production of the wind farm, (2) mechanical load analysis, (3) noise modeling, and (4) cost modeling with or without inclusion of financial metric, multi-objectives, and multi-constraints for determining wind turbine locations within the wind power plant.

In addition, the method provides flexibility with analysis tools to quantify plant design metrics wherein the tools for optimization are not restricted to particular tools (e.g., computer software), permitting the ability to allow the use of current and future tools for the analysis. In addition, the method permits the use of the tools to generate grids of information, or easily accessible data, such from lookup tables, and similar configuration, that can be used in the optimization loop in lieu of the detailed analysis tools themselves.

Another advantage includes the ability for mechanical loads analysis to be utilized directly in the determination of the placement of the wind turbines in the wind power plant.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
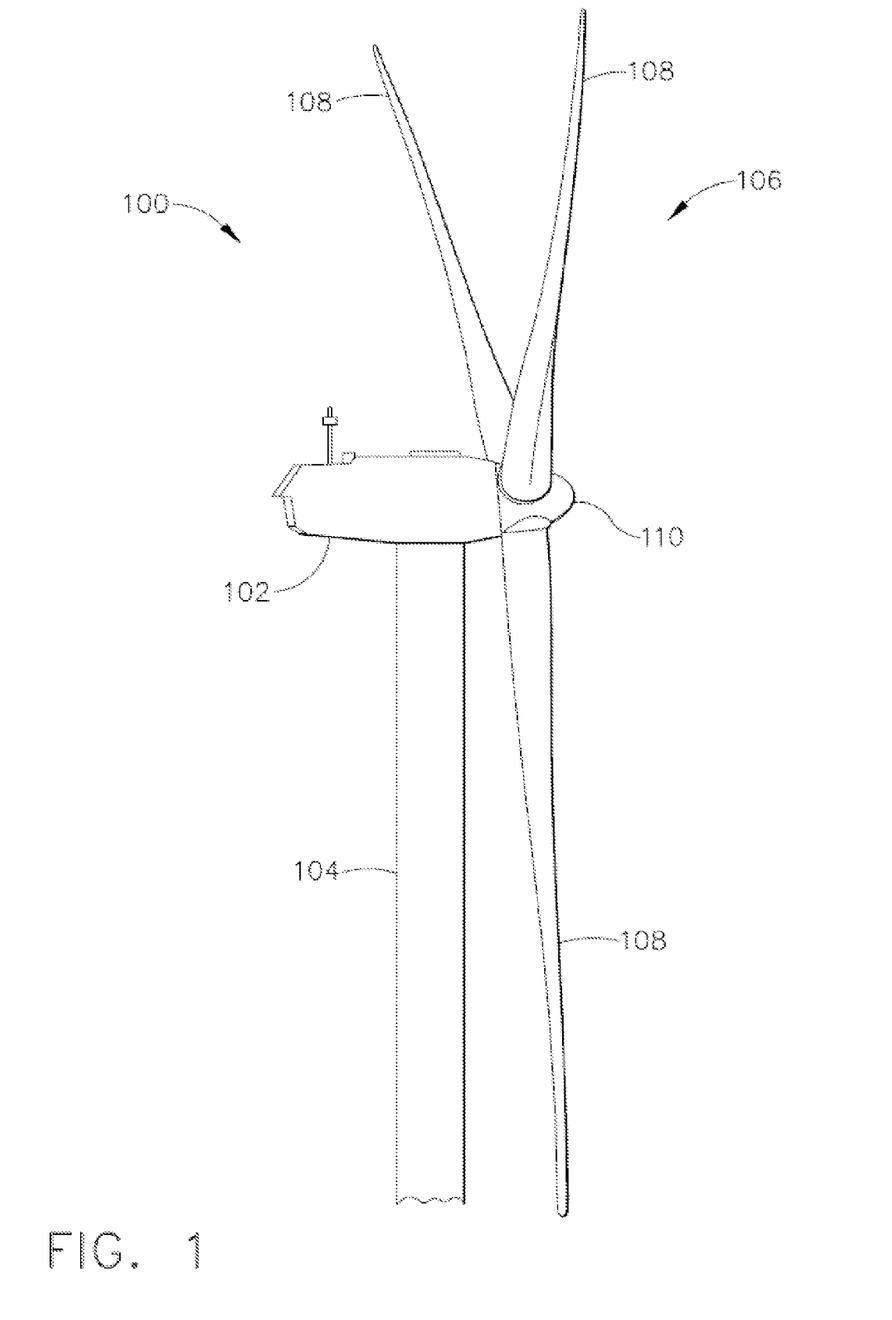
FIG. 1 shows an illustration of an exemplary configuration of a wind turbine.

As shown in FIG. 1, a wind turbine 100 generally comprises a nacelle 102 housing a generator (not shown in FIG. 1). Nacelle 102 is a housing mounted atop a tower 104, only a portion of which is shown in FIG. 1. The height of tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or off-shore locations. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention. As the blades 108 rotate, noise is generated by the blades 108 and other components.

Figure 2:
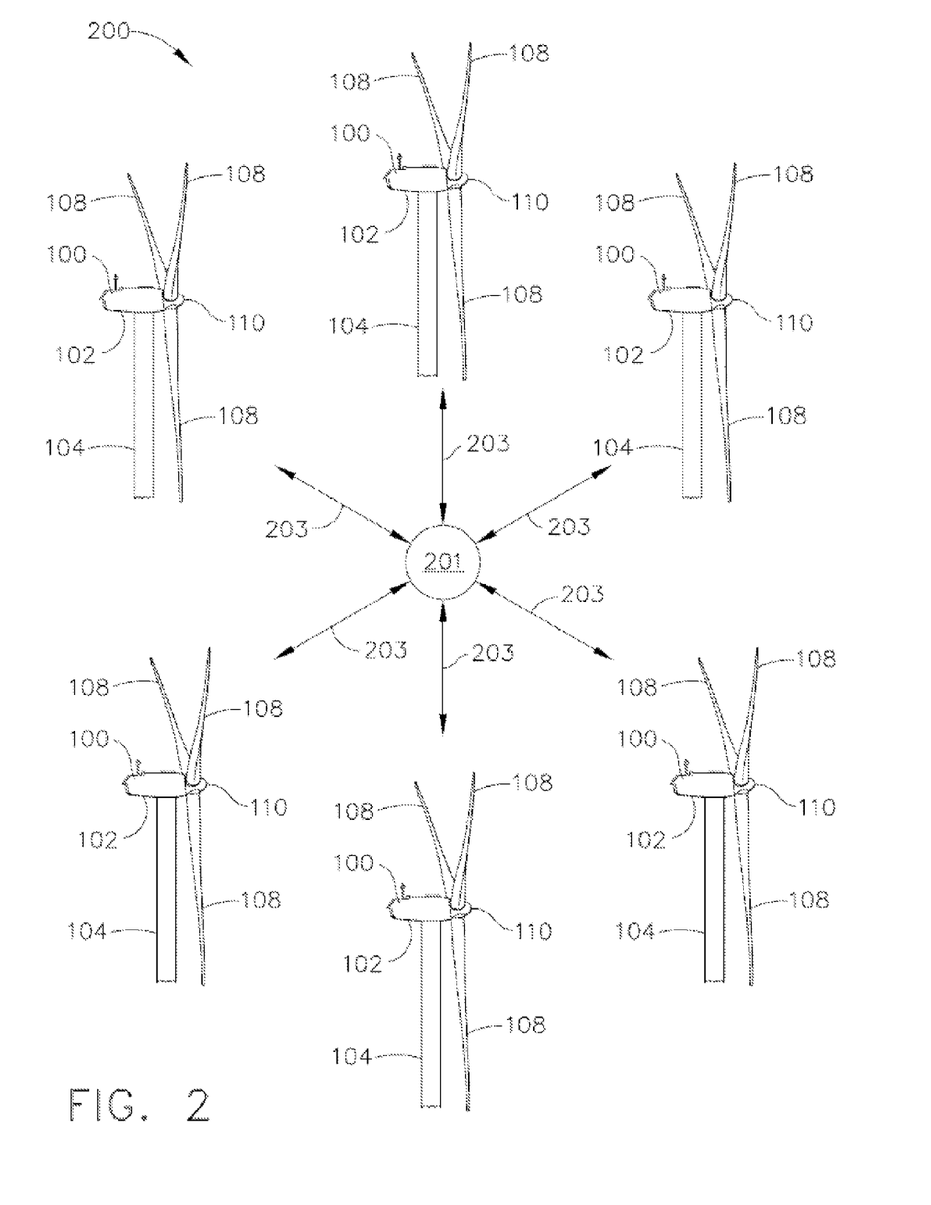
FIG. 2 shows a schematic view of a wind power plant according to an embodiment of the present disclosure.

FIG. 2 shows a schematic representation of a wind power plant 200. The wind power plant 200 includes a plurality of wind turbines 100, preferably controlled and/or monitored from a central monitoring device 201. Signals 203 may be transferred to and/or from wind turbines 100 to provide monitoring data and/or control signals. The number of wind turbines 100 in the plant 200 is not limited and may include one or a large number of wind turbines 100. The wind power plant 200 is arranged to provide a combined power output.

Figure 3:
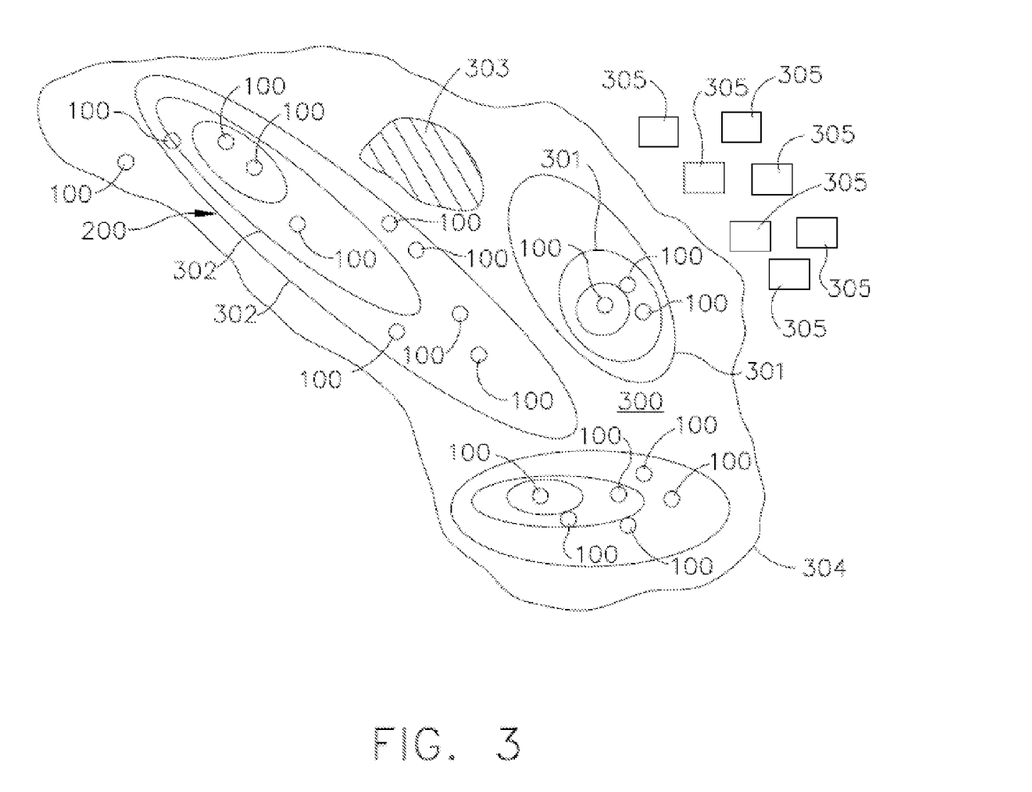
FIG. 3 shows a plan view of a wind power plant on a site deemed suitable for wind power (wind turbine site) according to an embodiment of the present disclosure.

One embodiment of the present disclosure includes a method for determining beneficial placement of a wind turbine within a wind power plant over a particular region or site. FIG. 3 includes a wind turbine site 300 bounded by boundary line 304. The site 300 includes a plurality of wind turbines 100 arranged therein. The wind power plant 200 encompasses the plurality of wind turbines 100 arranged on a variety of topography. The orography includes elevation contour lines 301 delineating changes in elevation within site 300. The surface roughness 302 represents the ground cover and its influence on the wind conditions within site 300. The topography is also important to consider if significant dwellings and industrial buildings are in the vicinity. In addition, site 300 shows an exclusion zone 303, which may be a lake, unstable soil, inhospitable terrain or other area on which a wind turbine cannot be located for any reason. Further, the site 300 may include or be in close proximity to noise sensitive areas 305, which may include homes, businesses, natural reserves, or other areas that are sensitive or intolerant to noise or close proximity to wind turbines 100. The exclusion zones 305 are not limited to areas that are sensitive to noise, but may include areas that are sensitive or intolerant to the presence of the wind turbine 100, the wind turbine structure (e.g., tower 104) or the associated structures or support components (e.g., access roads or protective fences, migratory bird paths, habitat area reduction concerns for various animals, etc.).

The present disclosure provides a methodology that determines the beneficial placement of wind turbines 100 within a wind turbine site. For example, as illustrated in FIG. 3 and shown in FIGS. 4 and 5, the method of the present disclosure may provide wind turbine locations that include simultaneous consideration of wind or meteorological conditions, design limits of the wind turbines in terms of mechanical loads on wind turbine components and foundation, ground orography and surface roughness, exclusion zones, noise sensitivity, cost and energy production performance and/or economics.

Figure 4:
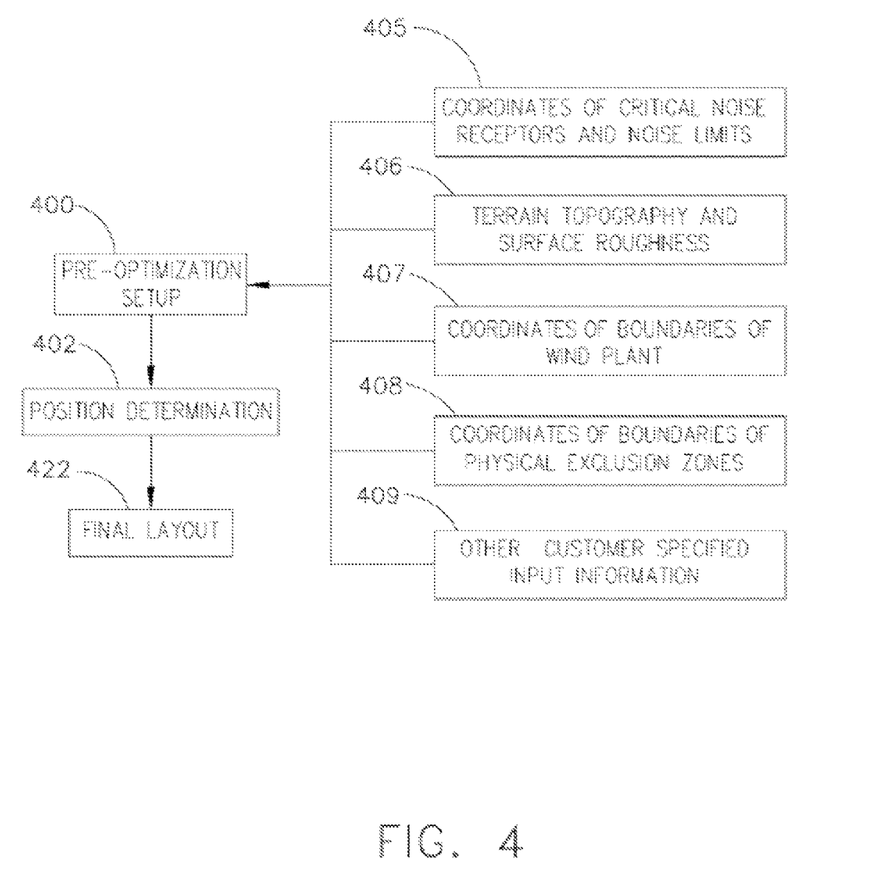
FIG. 4 shows an overall process flow diagram according to an embodiment of the present disclosure.

FIG. 4 shows an overall process flow diagram illustrating an exemplary method according to an embodiment of the disclosure. The method includes a pre-optimization set-up, step 400, a position determination, step 402 and a final layout, step 422. The pre optimization set-up, step 400, may include and is not limited to the shown five categories: 1) coordinates of important noise receptors and corresponding noise limits, step 405, 2) terrain topography and surface roughness, step 406, 3) coordinate boundaries of the wind plant, step 407, 4) coordinate boundaries of exclusion zones, step 408, and 5) wind and other meteorological data measured on the site or predicted for the site and other customer specified input information, step 409. The inputs from steps 405, 406, 407, 408 and 409 may be supplied by a customer or other entity or may be measured or determined in any suitable manner. For example, the coordinates of important noise receptors and noise limits, step 405, may be specified by a wind turbine developer/operator/owner or may be determined by physical surveying of the wind power plant area. "Coordinates", as used herein, refer to relative positions and are not limited to a particular location determining system. For example, the wind turbine layout may be configured into an (x,y) coordinate plane for purposes of identifying individual locations. However, the present disclosure is not so limited.

The terrain topography and surface roughness, step 406, may be obtained from any available source or may be determined directly. For example, satellite images, or available topographic maps may be utilized to determine the relative elevations and the topography 302 of the site 300. The coordinate boundaries of the site 300, step 407 are locations that may be predetermined or may be naturally defined by the area of consideration. For example, the site 300 may be bound by the area owned by the wind power plant 200 operator. The coordinate boundaries or location of exclusion zones 303, step 408, may be determined by physical inspection of the site 300, satellite imagery, geologic study or by any other method or source that provides suitability of areas to permit installation of a wind turbine 100. Exclusion zones may also result from environmental or wild life concerns such as, but not limited to, protected areas or migratory bird paths. In another embodiment the layout of individual wind turbines 100 may be determined randomly or according to a predetermined pattern. In still another embodiment the layout of individual wind turbines 100 may be determined from an adjusted wind turbine position through a loop in the process. In addition to the coordinates (x,y) of each turbine, the number of turbines can also be a design variables or it can be fixed. In addition, other inputs may be provided by the wind power plant developer/operator/owner or other source, step 409 to provide the pre-optimization setup. Other inputs may include real estate transaction considerations, known problems or issue with particular areas not already inputted in steps 405-408. In addition, the pre-optimization set-up is not limited to the steps discussed above and may be accomplished in any suitable manner that provides sufficient information to provide a wind turbine layout.

The present disclosure provides a methodology that determines a beneficial placement of wind turbines 100 within a wind turbine site. For example, as illustrated in FIG. 3 and shown in FIGS. 4 and 5, the method of the present disclosure may provide wind turbine locations that include simultaneous consideration of wind or meteorological conditions, design limits of the wind turbines in terms of mechanical loads on wind turbine components and foundation, ground orography and surface roughness, exclusion zones, noise sensitivity, cost and energy production performance and/or financial metrics.

Figure 5:
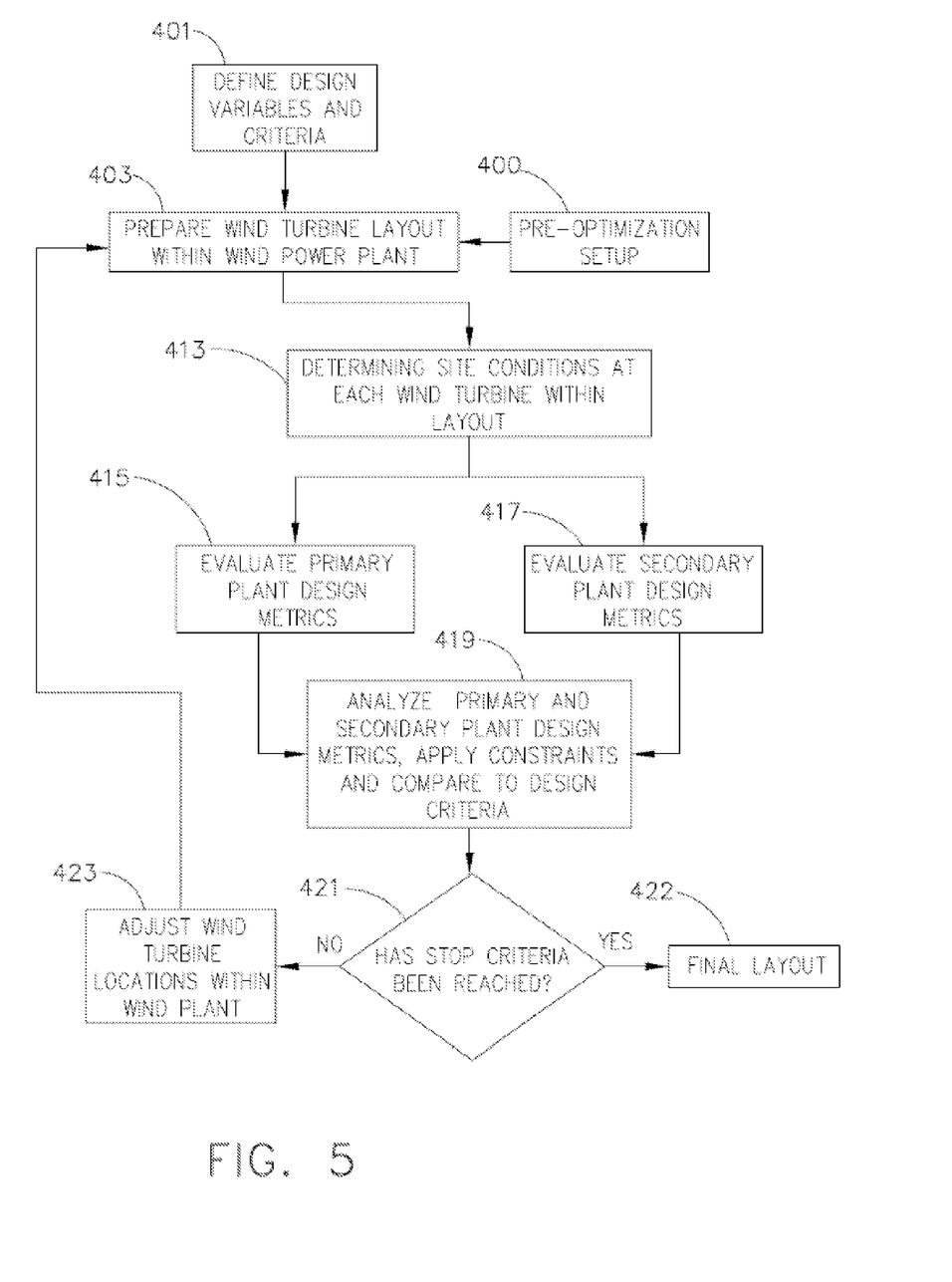
FIG. 5 shows a process flow diagram according to an embodiment of the present disclosure.

FIG. 5 shows a process flow diagram illustrating an exemplary method according to an embodiment of the disclosure. To determine the beneficial locations for wind turbines within the wind power plant, a design criteria is determined or selected, step 401. The design criteria may include the goals and constraints imposed by a particular site 300. The design criteria may include portions of site 300 that restrict certain locations of a wind turbine 100 or exclude the ability to position a wind turbine at a particular location. While not so limited, the design criteria may include maximum energy production and minimized cost. In other embodiments, the design criteria may include maximum energy production while meeting the not to exceed noise limits that apply to noise sensitive areas 305. Other variables may include the particular turbine model desired, the hub height, and the turbine controller strategy. The method may permit the beneficial selection of the wind turbine locations for design criteria, such as maximum energy production with wind turbine design load margins that are within the design limits. In another embodiment, minimum cost and/or minimum noise may be utilized as design criteria. In this embodiment, the method can seek to meet one or several objectives (e.g., maximum energy capture and minimum cost) at the same time while satisfying the constraints of having all load design margins positive and not exceeding any of the noise constraints. Further still, a financial model may be used alternatively or in addition to other design criteria. In this embodiment, the energy production and total cost of the wind power plant may be inputted into a financial design criteria. While not so limited, other design criteria may include, either alone or in combination, maximum capacity factor, minimum wake losses, minimum cost, maximum internal rate of return, maximum developer fee, minimum cost of energy, and maximum net present value. While not limited to these combinations or number of factors, design criteria may include the following factors: (1) maximum energy production and (2) minimum cost (of turbines+infrastructure). In addition, the two design criteria can be combined into a single financial metric such as internal rate of return or net present value. Three important constraints include the following: (1) mechanical load design margins within the design envelope of the wind turbine model/configuration of interest, (2) noise at critical receptors within the noise limits, and (3) no wind turbine located in exclusion zones or outside the site boundaries. Several secondary design metrics may include, but are not limited to, minimum noise, maximum capacity factor, minimum wake losses (i.e., energy production losses due to wind turbine wakes), minimum mechanical loads (i.e., maximum design load margins or minimizing the mechanical load levels) and combinations thereof. When two or more design criteria are utilized, the method may provide, for example, a Pareto front (i.e., tradeoff curve/surface between the two/three objectives), which may be utilized to make the design decisions for the turbine locations. Any combination of design criteria and/or constraints can be prescribed in the invention. There is no limit to the number of design criteria nor number of constraints. The design criteria and constraints are design metrics, either primary metrics or secondary metrics.

Once the design criteria and constraint(s) are determined, a wind turbine layout is prepared within a wind plant 200, step 403. The layout is prepared using information from the pre-optimization setup, step 400 (see also FIG. 4).

Once a wind turbine layout is determined, the site conditions of the site 300 are determined, step 413. "Site conditions", as used herein include wind conditions, conditions at the site, atmospheric conditions, or any other conditions that affect the operation of the wind turbine. For example, while not so limited, site condition determination includes determining wind conditions at each wind turbine position. Other site conditions, include air density, obtained from temperature and pressure data, flow inclination angle, and angle of the incoming wind with respect to the wind turbine rotor plane. The site conditions may be measured, calculated, forecasted, estimated, extrapolated or otherwise allocated for each wind turbine within the wind power plant 200. The wind conditions may include any suitable wind condition parameter, including, but not limited to wind speed, wind direction, vertical and horizontal wind shear, air density, meteorological conditions, or any other conditions that may be used to predict the energy production at the wind farm level and/or the wind turbine mechanical loads (fatigue and/or extreme). In addition, while not so limited, wind conditions and/or site conditions may include determination of extreme winds (e.g., gust speed having an average time of 10 minutes and a 50-year recurrence period), wind turbulence intensity, wind shear, flow inclination, or other parameters for analysis as site analysis metrics for site 300. While not so limited, commercially available wind or meteorologic models, such as WindPro™, WindFarmer™, or WindFarm™ models or calculations may be utilized to determine wind conditions and/or site conditions.

Once the site conditions are determined, primary plant design metrics are evaluated, step 415. The primary plant design metrics include, but are not limited to mechanical load design margins at each wind turbine location within layout, and the overall energy production for the wind power plant 200. The mechanical loads analysis may be performed on each wind turbine 100 in site 300 in response to the wind conditions determined in step 411. The mechanical load assessment may be performed with a suitable aeroelastic wind turbine simulation model or calculations based upon the particular wind turbine characteristics. Examples of commercially available wind turbine load analysis tools are BLADED (available from Garrad Hassan, Bristol, United Kingdom) and ADAMS-WT (available from MSC software, Santa Ana, Calif.). Any loads analysis tool may be utilized to model and/or determine mechanical load (fatigue and extreme) on the wind turbine 100 for a particular wind turbine or particular wind turbine design. For example, the mechanical load determination device may be a loads analysis tool that provides the loading level on different components (e.g., load sensors) of the wind turbine and calculates design load margins by comparing them to the design loads. The target is, for example, to have positive margins on all load sensors as compared with the design loads. In addition, both fatigue and extreme loads should be considered, but the loads analysis could be limited to fatigue loads only, or extreme loads only.

In addition to the determination of mechanical loads, the primary site design metrics includes a determination of overall energy production by the wind power plant. The overall energy production may be determined in any suitable manner, including, but not limited to modeling wind turbine performance based upon wind conditions and site conditions determined in step 413. Commercially available tools may be utilized to determine the energy production of each wind turbine, which can be summed up to the wind power plant level. The use of a wind resource grid is a particularly effective option to expedite the analysis, but then a wake model should be included to account for the reduced energy production from wind turbine wakes.

The primary plant design metrics preferably includes both the mechanical design load margins at each wind turbine location within layout, and overall energy production for the wind power plant 200, with each metric being individually weighted equally or not weighted equally.

One secondary design metric includes a cost model or calculation that quantifies the balance of plant cost or total wind power plant cost depending if the number of turbines is fixed or free to vary. The cost secondary design metric may be in addition to the economic model or may be provided exclusive of the economic model. The cost model secondary design metric is capable of quantifying the balance of plant cost and total wind power plant cost. In addition, an economic model or calculation that may include calculations based upon overall power capture, provides financial metrics such as internal rate of return. The economic model secondary design metric may provide financial metrics such as internal rate of return and developer fee, or other factors having an impact on the economics of the wind power plant.

Another secondary plant design metric includes noise at and in close proximity to each wind turbine within the wind power plant 200. In one embodiment, a noise model may be used to determine the sound pressure level at any point of interest within or in close proximity to site 300 based on the contribution of sound pressure level of some or all of wind turbines 100. For example, a method that utilizes a first order assessment of the total noise at any point of interest based on the ISO standard 9613-2 on acoustics may be utilized to provide the secondary plant design metric for noise.

The secondary design metric may include an economic analysis, cost analysis and/or the noise analysis of the wind power plant 200 in combination or alone, with each metric being individually weighted equally or not weighted equally.

Once the primary and secondary plant design metrics are determined, the primary and secondary plant design metrics are analyzed, constraints are applied and the plant design metrics are compared to the design criteria, step 419. The analysis of the primary and secondary site includes compiling the metrics and providing the comparison to the design criteria. For example, while not being limiting, the primary design metric for overall energy production may be compared against a maximum or desired design criteria for energy capture. In addition, one or more constraints to the layout may be applied. For example, the constraints may include positive design load margins. That is, the design load margins of the individual wind turbines may limit or penalize a particular location or plurality of locations of the wind turbines 100. In addition, an exemplary constraint may include a requirement for noise from all turbines below the maximum sound pressure level allowed at noise sensitive areas. The constraints may eliminate or penalize locations or layouts based on the particular constraints.

Once the analysis, constraint application and comparison have been accomplished, if a stop criteria has been reached, step 421, the layout is a final layout, step 422. The stop criteria may include, for example, a convergence of the plant design metrics on the design criteria, as determined in step 419. Alternatively, the stop criteria may be a predetermined number of iterations of the wind turbine layouts.

If the stop criteria has not been reached, the wind turbine locations within the layout are adjusted, step 423 and the process returns to the preparation of a wind turbine layout, step 403. The new locations in the adjustment of the wind turbine locations in step 423 may be determined in any suitable manner. For example, while not so limited, a genetic algorithm may be utilized to determine the new locations for the wind turbines 100. In another embodiment, the new positions for the wind turbines 100 within the wind plant 200 may be randomly determined. Suitable algorithms for determining the adjustment of the wind turbine locations may include calculations or models such as genetic algorithms and differential evolution, random search techniques such as adaptive Metropolis search, and deterministic search techniques including both gradient-based and non-gradient based methods.

Example

FIGS. 6-10 show iterative solutions found for wind turbine layouts according to the method of the present disclosure. Each of the shown layouts includes wind turbines 100 arranged within site 300, bound by boundary 304. The example shown in FIG. 6-10 also includes an exclusion zone 303 within site 300.

Figure 6:
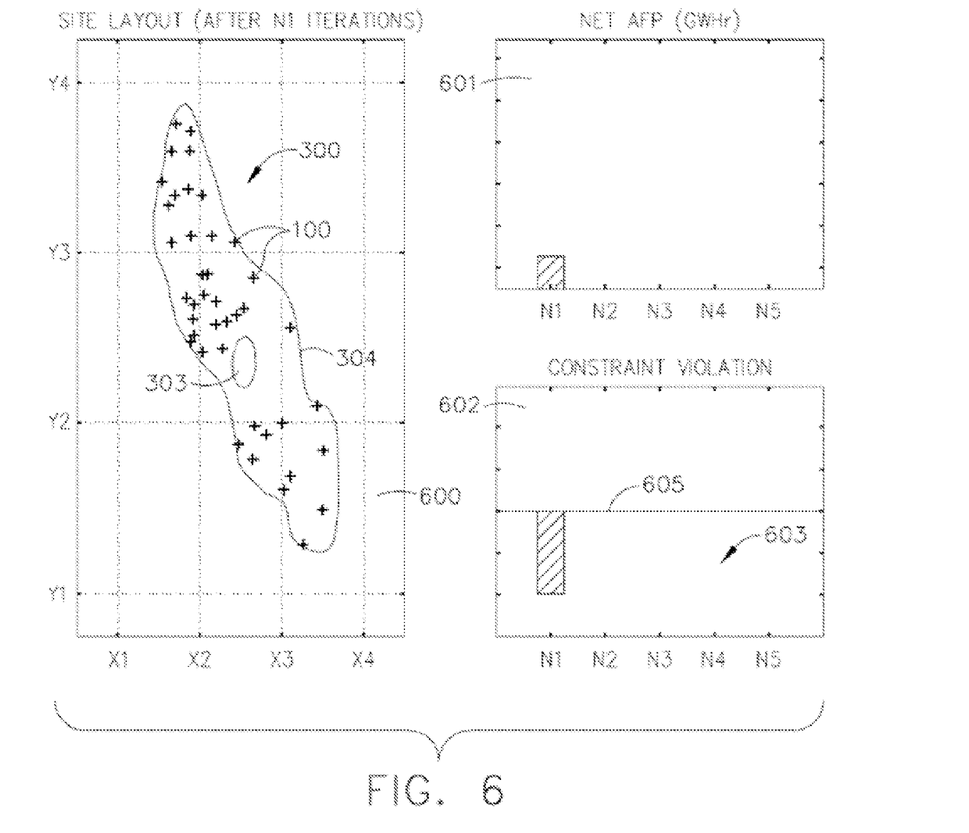
FIGS. 6-10 show calculations and representative layouts for calculations made for an example performed according to an embodiment of the present disclosure.

As shown in FIG. 6, a layout 600 is evaluated according to the method of the present disclosure after N1 iterations. The design criteria included maximizing the annual energy production (AEP). The plant design metrics included the net annual energy production (AEP) and the mechanical design load margins, both primary metrics. The evaluation chart 601 for the design criteria is shown as Net AEP in gigawatt hours (GWhr). The constraint enforced included positive mechanical design load margins for all wind turbines, and the Control Violation chart 602 includes a violation region 603 corresponding to the magnitude of constraint penalties imposed on the layout. A compliance line 605 corresponds to a point wherein the layout corresponding to the particular iteration is not penalized by the constraint (see e.g., FIGS. 8-10). With each iteration, the layout is adjusted in accordance with the evaluation of the plant design metrics (i.e., the annual energy production and the mechanical design load margins).

Figure 7:
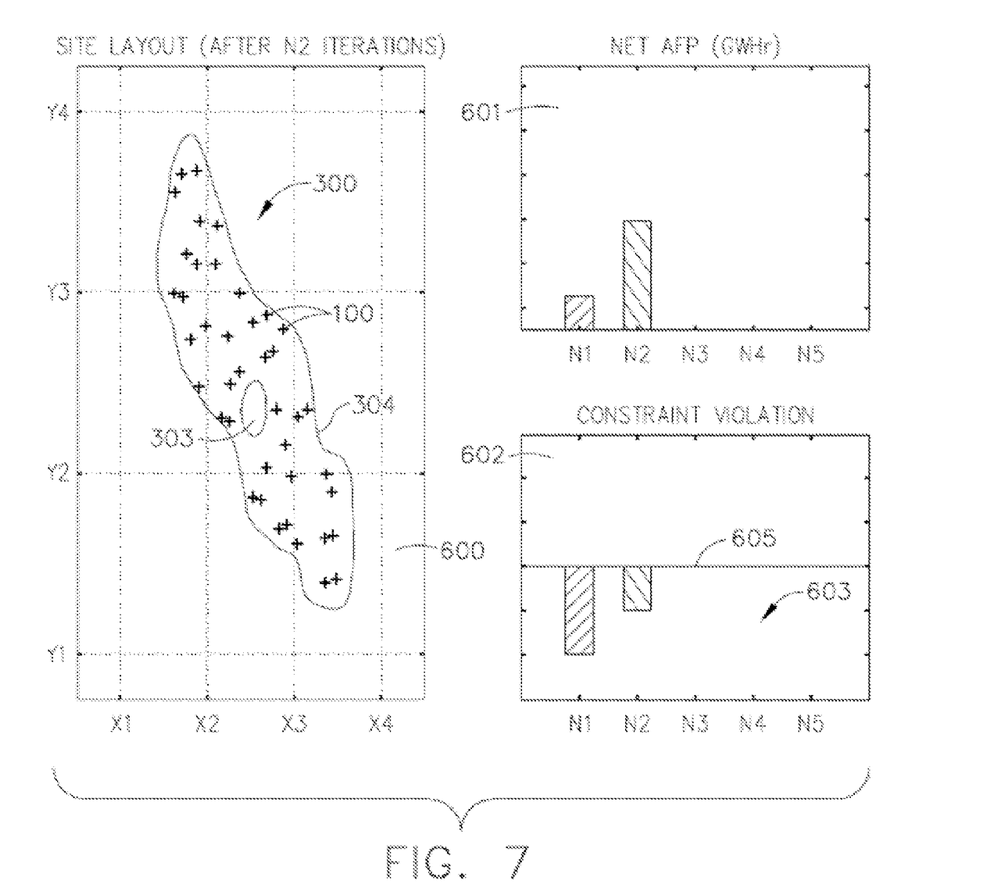
Figure 8:
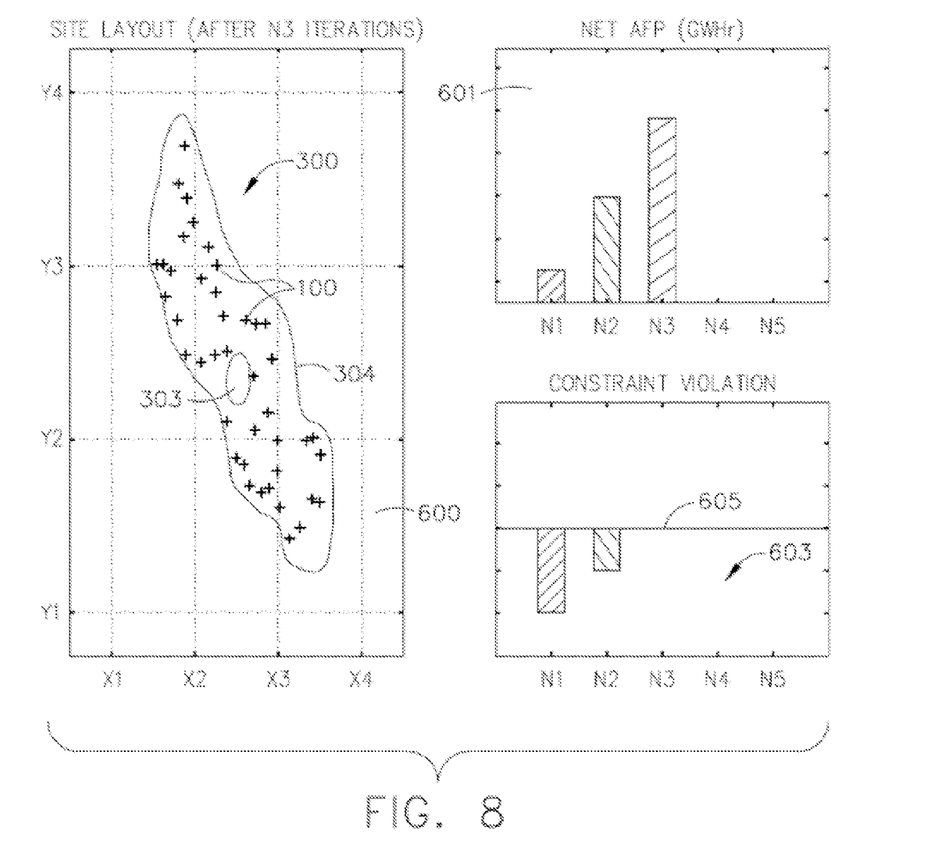
Figure 9:
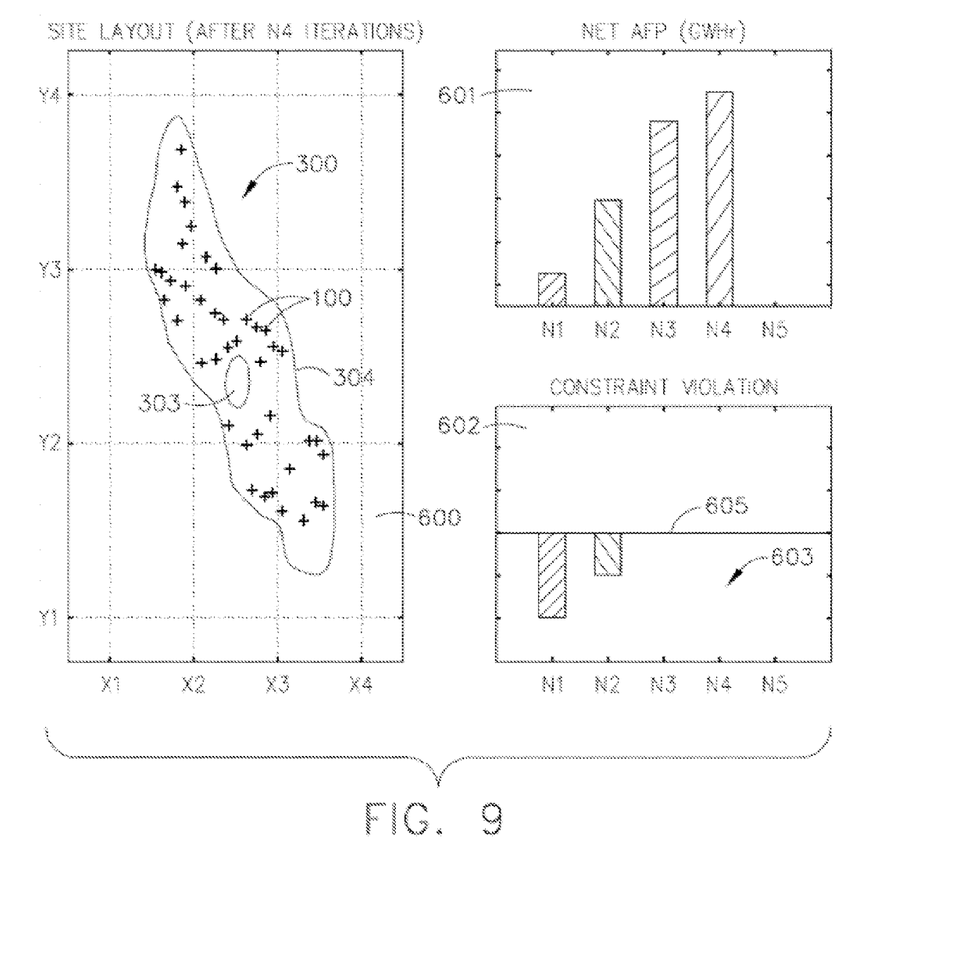
Figure 10:
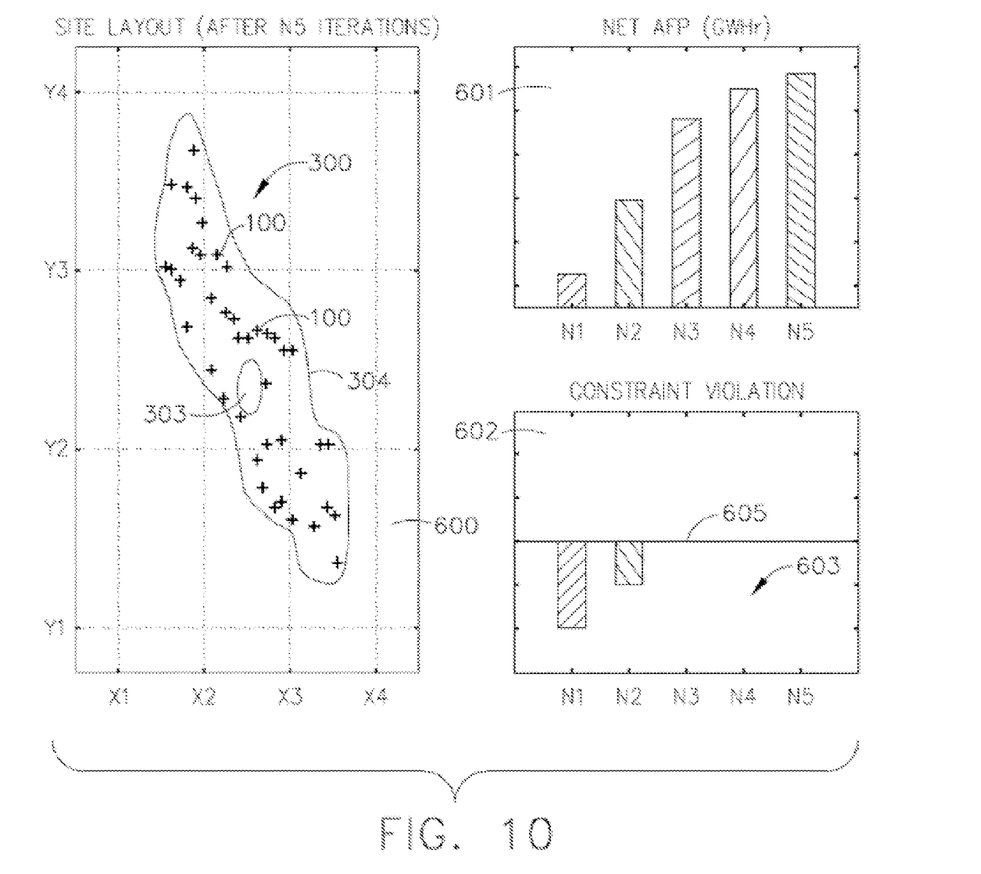

As shown in FIG. 7, a layout 600 is evaluated according to the method of the present disclosure after N2 iterations. As shown in FIG. 8, a layout is evaluated according to the method of the present disclosure after N3 iterations. As shown in FIG. 9, a layout is evaluated according to the method of the present disclosure after N4 iterations. As shown in FIG. 10, a layout is evaluated according to the method of the present disclosure after N5 iterations. At N5 iterations, the final layout was determined based upon a desired value AEP, with a maximum limit (i.e., N5) corresponding to a predetermined maximum number of iterations, on the number of iterations crossed with a desired solution reached (e.g., 5% improvement in AEP), which included the design criteria.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining wind turbine location within a wind power plant comprising:
   determining at least one design criteria;
   providing a wind turbine layout including at least one wind turbine location;
   determining site conditions at the at least one wind turbine location;
   determining one or more plant design metrics in response to the site conditions, wherein the one or more plant design metrics include mechanical design load margins for at least one wind turbine, wherein the at least one wind turbines is selected from the same or different wind turbine models and configurations;
   analyzing using a computer the one or more plant design metrics in response to the site conditions;
   applying constraints to the wind turbine layout;
   comparing plant design metrics and constraints to design criteria;
   selectively adjusting wind turbine locations in response to the comparing step; and
   providing wind turbine locations.

2. The method of claim 1, wherein the design criteria is selected from the group consisting of maximum energy production, maximum capacity factor, minimum wake losses, minimum cost, maximum internal rate of return, maximum developer fee, minimum cost of energy, maximum net present value, and combinations thereof.

3. The method of claim 1, wherein the site conditions are selected from the group consisting of wind speed, wind direction, wind shear, wind turbulence intensity, air density, meteorological conditions and combinations thereof.

4. The method of claim 1, wherein the one or more plant design metrics further include a primary plant design metric and a secondary plant design metric.

5. The method of claim 4, wherein the primary plant design metric is selected from the group consisting of mechanical design load margins at each wind turbine location within layout, and overall energy production for the wind power plant.

6. The method of claim 4, wherein the secondary plant design metric is selected from the group consisting of economic model, wind turbine cost, noise constraints, exclusion zones, and combinations thereof.

7. The method of claim 1, wherein the constraints directly constrain an area available for placement of wind turbines and the mechanical design load margins.

8. The method of claim 1, wherein the step of selectively adjusting includes determining whether a stop criteria is present.

9. The method of claim 1, wherein the step of selectively adjusting includes determining wind turbine locations in the layout based upon a genetic algorithm, differential evolution, random search techniques, deterministic search techniques, and combinations thereof.

10. The method of claim 1, further comprising preparing the wind turbine layout using a pre-optimization set-up.

11. A wind plant comprising:
    a plurality of wind turbines disposed in locations corresponding to a calculated wind turbine layout, the calculated wind turbine layout being a layout determined from a method comprising:
    determining at least one design criteria;
    providing an initial wind turbine layout including at least one wind turbine location;
    determining site conditions at the at least one wind turbine location;
    determining at least one plant design metric in response to the wind conditions and site conditions, wherein the one or more plant design metrics include mechanical design load margins for at least one wind turbine, wherein the at least one wind turbine is selected from the same or different wind turbine models and configurations;
    analyzing the at least one plant design metric in response to the wind conditions and site conditions;
    applying constraints to the wind turbine layout;
    comparing the at least one plant design metric and constraints to design criteria; and
    selectively adjusting wind turbine locations in response to the comparing step to form the calculated wind turbine layout.

12. The wind plant of claim 11, wherein the design criteria is selected from the group consisting of maximum energy production, maximum capacity factor, minimum wake losses, minimum cost, maximum internal rate of return, maximum developer fee, minimum cost of energy, maximum net present value, and combinations thereof.

13. The wind plant of claim 11, wherein the site conditions are selected from the group consisting of wind speed, wind direction, wind shear, wind turbulence intensity, air density, meteorological conditions and combinations thereof.

14. The wind plant of claim 11, wherein the at least one plant design metric further includes a primary plant design metric and a secondary plant design metric.

15. The wind plant of claim 14, wherein the primary plant design metric is selected from the group consisting of mechanical design load margins at each wind turbine location within layout, and overall energy production for the wind power plant.

16. The wind plant of claim 14, wherein the secondary plant design metric is selected from the group consisting of economic model, wind turbine cost, noise constraints, and combinations thereof.

17. The wind plant of claim 11, wherein the constraints directly constrain an area available for placement of wind turbines.

18. The wind plant of claim 11, wherein the selectively adjusting includes determining wind turbine locations in the layout based upon a genetic algorithm, differential evolution, random search techniques, deterministic search techniques, and combinations thereof.

19. A method for determining a wind turbine layout comprising:
- determining at least one design criteria;
- providing a wind turbine layout including at least one wind turbine location;
- determining site conditions at the at least one wind turbine location;
- determining one or more plant design metrics in response to the site conditions, wherein the one or more plant design metrics include mechanical design load margins for at least one wind turbine, wherein the at least one wind turbine is selected from the same or different wind turbine models and configurations;
- analyzing using a computer one or more plant design metrics in response to the wind conditions and site conditions;
- applying constraints to the wind turbine layout;
- comparing plant design metrics and constraints to design criteria;
- selectively adjusting wind turbine locations in response to the comparing step;
- wherein the design criteria are externally provided and selective adjustment is continued until the layout meets the design criteria; and
- providing wind turbine locations.

20. The method of claim 19, further comprising providing an adjusted wind turbine layout that corresponds to the externally provided design criteria.

* * * * *